United States Patent
Ono et al.

(10) Patent No.: US 7,612,943 B2
(45) Date of Patent: Nov. 3, 2009

(54) OPTICAL DEVICE AND CRYSTALLIZATION DEVICE

(75) Inventors: Takashi Ono, Hadano (JP); Kazufumi Azuma, Yokohama (JP); Masakiyo Matsumura, Kamakura (JP)

(73) Assignee: Advanced LCD Technologies Development Center Co., Ltd., Yokohama-shi (JP)

( * ) Notice: Subject to any disclaimer, the term of this patent is extended or adjusted under 35 U.S.C. 154(b) by 25 days.

(21) Appl. No.: 11/875,276

(22) Filed: Oct. 19, 2007

(65) Prior Publication Data

US 2008/0112057 A1     May 15, 2008

(30) Foreign Application Priority Data

Nov. 9, 2006    (JP)   ............................ 2006-304417

(51) Int. Cl.
     *G02B 27/10*     (2006.01)
(52) U.S. Cl. ........................ 359/618; 359/622; 359/626
(58) Field of Classification Search ................. 359/622, 359/628, 626, 668, 671, 708, 719, 618, 619; 372/108
See application file for complete search history.

(56) References Cited

U.S. PATENT DOCUMENTS

| | | | |
|---|---|---|---|
| 6,621,639 B2 * | 9/2003 | Kahlert et al. | ............... 359/622 |
| 7,215,475 B2 * | 5/2007 | Woodgate et al. | ............ 359/624 |
| 7,456,371 B2 * | 11/2008 | Kasahara et al. | ....... 219/121.65 |

FOREIGN PATENT DOCUMENTS

| JP | 2000-306859 | 11/2000 |
|---|---|---|
| JP | 2005-311340 | 11/2005 |

OTHER PUBLICATIONS

Masakiyo Matsumura, "Preparation of Ultra-Large Grain Silicon Thin-Films by Excimer-Laser", Journal of the Surface Science Society of Japan, vol. 21, No. 5, May 2000, pp. 32-41 and two cover pages (with English Abstract).

* cited by examiner

*Primary Examiner*—Mohammed Hasan
(74) *Attorney, Agent, or Firm*—Oblon, Spivak, McClelland, Maier & Neustadt, L.L.P.

(57) ABSTRACT

An optical device comprises a first cylindrical lens array in which a plurality of first lens segments each having a first radius of curvature and a first width so as to divide laser light into a plurality of light components are arranged, and a plurality of second lens segments each having a second radius of curvature and a second width, and provided in at least one position of the first cylindrical lens array so as to be arranged between adjacent first lens segments.

5 Claims, 8 Drawing Sheets

OPTICAL DEVICE AND CRYSTALLIZATION DEVICE

CROSS-REFERENCE TO RELATED APPLICATIONS

This application is based upon and claims the benefit of priority from prior Japanese Patent Application No. 2006-304417, filed Nov. 9, 2006, the entire contents of which are incorporated herein by reference.

BACKGROUND OF THE INVENTION

1. Field of the Invention

The present invention relates to an optical device for dividing incident laser light into a plurality of light components and, more particularly, to an optical device suitably used as a crystallization device used to produce a crystallized semiconductor film by irradiating a non-singlecrystalline semiconductor film such as an amorphous silicon (a-Si) film with pulsed laser light having a predetermined light intensity distribution.

2. Description of the Related Art

A thin-film-transistor (TFT) used as a switching element for selecting display pixels of a liquid-crystal-display (LCD) is formed on an amorphous-silicon film or a poly-silicon film. The poly-silicon film is constituted of a large number of crystal grains, and hence when a TFT is formed on a poly-silicon film, a crystal grain boundary is formed in a channel region, and the crystal grain boundary becomes a barrier to the movement of electrons and positive holes. For this reason, there is a problem that in a poly-silicon film, mobility of electrons or positive holes becomes low as compared with the case of a singlecrystalline silicon film. Further, a number of TFTs formed on a poly-silicon film are different from each other in the number, position, and shape or the like of crystal grain boundaries formed in the channel region, which causes variations in the TFT characteristics, and causes, in the case of a liquid-crystal-display, a problem of display unevenness.

In order to improve mobility of electrons or positive holes, and reduce variations in the TFT characteristics, a phase control ELA (excimer laser annealing) method is proposed in Surface Science vol. 21, No. 5, pp. 278-287 (pp. 32-41), 2000 (Non-Pat. Document 1) and Jpn. Pat. Appln. KOKAI Publication No. 2000-306859 (Pat. Document 1) and the like. In the phase control ELA method, by using an illumination optical system provided with a homogenizer for homogenizing an in-plane light intensity distribution and a phase shifter for phase-modulating incident laser light to form a light intensity profile of strength and weakness, it is possible to form pulsed laser light having a desired light intensity profile of strength and weakness and form a crystallized region of a large grain size by irradiating a desired position of a non-singlecrystalline silicon thin film with the thus formed pulsed laser light. Specifically, the light receiving region of the non-singlecrystalline silicon thin film irradiated with the pulsed laser light having a desired light intensity profile of strength and weakness is melted, as a solid-liquid separation position moves in the lateral direction in accordance with the light intensity profile of strength and weakness in the process of a temperature fall of the melted region in the shutoff period the laser light, the crystallized position also moves in the lateral direction, and crystallized silicon constituted of crystal grains of having such a large grain size as to allow at least one channel region to be formed can be formed.

It is described in Jpn. Pat. Appln. KOKAI Publication No. 2005-311340 (Pat. Document 2) that in order to improve the degree of freedom of design of the optical system in the phase control ELA method, a particular type of abaxial cylindrical lens is used as a homogenizer. The cylindrical lens described in Pat. Document 2 is constituted of a lens array in which lens segments M having the same size and shape (semicylindrical shape obtained by cutting a cylinder in halves in the axial direction, and having the same curvature of the light transmission surface) are aligned as shown in FIG. 7A.

However, there has been a problem that when the in-plane light intensity distribution is homogenized by using the conventional cylindrical lens 300 described in Pat. Document 2, and a crystallization process is executed by using the crystallization device described in Non-Pat. Document 1 or Pat. Document 1, the light intensity profile of strength and weakness having a sinusoidal shape shown in Non-Pat. Document 1, p. 284 (p. 38), FIG. 9(*a*) cannot be formed. The present inventors have eagerly studied about the cause-and-effect relationship. As a result, it was found that a ringing (transient oscillation) phenomenon in which the light intensity unstably fluctuated was caused in the periphery of the transmitted light of the homogenizer as shown in FIG. 8A. It was found that in the region of the non-singlecrystalline semiconductor irradiated with light in which the ringing phenomenon is caused, crystallization of a desired size does not progress, and consequently, the crystallized region in the ringing region becomes small and a crystallized region having a size corresponding to a channel region cannot be formed, thereby lowering the yield of manufacture.

As the means for removing light in which a ringing phenomenon is caused, it is conceivable that a mask may be provided in the light transmission path of the homogenizer, there is however a problem that laser light from the laser light source cannot be utilized effectively.

BRIEF SUMMARY OF THE INVENTION

The present invention has been contrived to solve the problem described above, and an object thereof is to provide an optical device and a crystallization device capable of suppressing ringing and radiating homogeneous laser light.

An optical device according to the present invention is characterized by comprising: a first cylindrical lens array in which a plurality of first lens segments each having a first radius of curvature and a first width so as to divide laser light into a plurality of light components are arranged; and second lens segments each having a second radius of curvature and a second width which are respectively different from the first radius of curvature and the first width, and provided in at least one position of the first cylindrical lens array so as to be interposed between adjacent first lens segments.

A crystallization device according to the present invention is a device which homogenizes a light intensity distribution of incident pulsed laser light by an optical device for homogenizing a light intensity distribution of incident pulsed laser light, changes the homogenized pulsed laser light into pulsed laser light having a light distribution of an inverse peak pattern, and crystallizes a non-singlecrystalline film by irradiating the film with the pulsed laser light, and is characterized in that the optical device for homogenizing a light intensity distribution includes a first cylindrical lens array in which a plurality of first lens segments each having a first radius of curvature and a first width so as to divide laser light into a plurality of light components are arranged, and second lens segments each having a second radius of curvature different from the first radius of curvature and a second width different from the first width, and provided in at least one position of the first cylindrical lens array so as to be interposed between adjacent first lens segments.

Technical terms in this description are defined as follows.

The term "phase shifter" implies a spatial intensity modulating element for modulating the phase of light, and is distinguished from the phase shifting mask used in an exposure step in the photolithgraphy process. The phase shifter is formed by forming a stepped portion on, for example a quartz substrate.

The term "homogenizer" implies an optical device for dividing incident light into a plurality of light components in a plane, causing these divided light components to converge, and homogenizing the light intensity in a specific plane.

The term "crystallization" implies a process in which a film of a crystallization object is melted, and in the process of a temperature fall and solidification of the melt, crystal growth takes place from a crystal nucleus serving as a starting point.

The term "lateral growth" implies a process in which a film of a crystallization object is melted, and in the process of a temperature fall and solidification of the melt, and while the position of solidification moves in the lateral direction along the film surface of the crystallization object, the growth of the crystal grains progresses in the lateral direction along the film surface.

The term "light intensity distribution (beam profile)" implies a two-dimensional intensity distribution of light made incident on a film of the crystallization object for example, a non-singlecrystalline semiconductor film for the purpose of crystallization. In other words, "light intensity distribution" is a light intensity (brightness) distribution of the irradiation light (illumination light) on the detection surface.

The term "laser fluence" implies a measure for expressing energy density of laser light at a certain position, i.e., an amount obtained by integrating an energy amount per unit area with respect to time. More specifically, it is average intensity of laser light measured at the light source or in the irradiation region. The term "average laser fluence" implies the laser fluence homogenized in a certain processing area.

The term "attenuator" implies an optical element for attenuating the intensity of laser light. An attenuator has a function of adjusting the light intensity level of the laser light so as not cause a burnt-out state on the substrate to be processed.

The term "recipe" implies various processing conditions set for each product on the basis of specifications of a product to be manufactured.

The term "device parameter" implies optimum conditions for crystallization which a crystallization device inherently has in accordance with the recipe for crystallization.

The term "lens segment" implies a functional lens section of the minimum unit constituting a cylindrical lens.

The term "curvature of lens segment" implies a curvature of a light incidence plane or light outgoing plane of a lens segment. Further, the term "diameter of lens segment" implies a diameter of a light incidence plane or light outgoing plane of a lens segment.

DETAILED DESCRIPTION OF THE INVENTION

Figure 1:
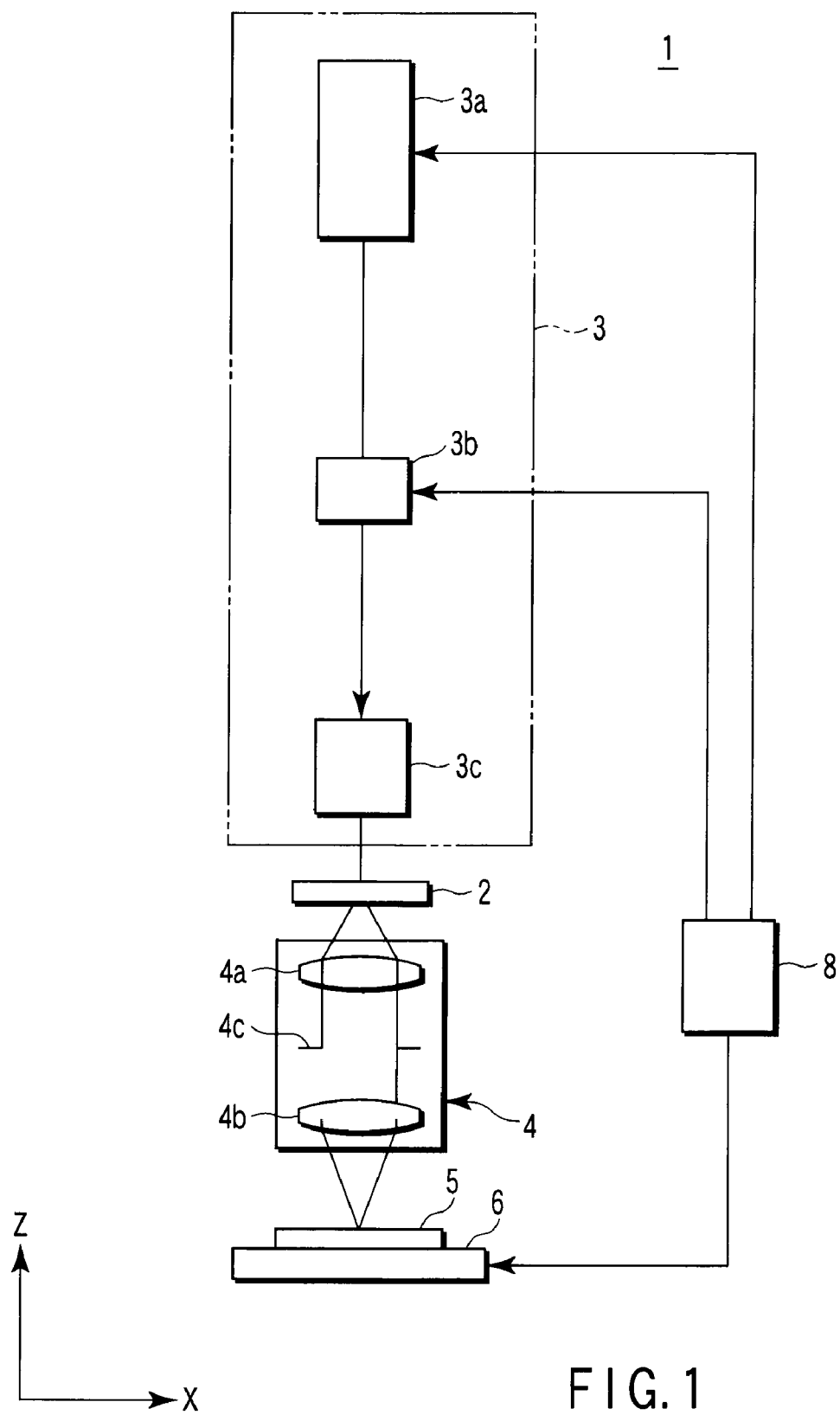
FIG. 1 is a configuration block diagram showing an outline of an entire laser irradiation device.

Various embodiment for carrying out the present invention will be described below with reference to the accompanying drawings.

First, an example of a crystallization device of the present invention will be described below with reference to FIGS. 1 to 5. A crystallization device 1 is a projection type excimer laser irradiation device, and comprises an illumination section 3, a phase shifter 2, an imaging optical system 4, and a substrate stage 6. The illumination section 3 is provided with a laser light source 3a, attenuator 3b serving as laser light intensity adjusting means arranged on the laser light path from the light source 3a, and an illumination optical system 3c including homogenizers 33 and 34 for homogenizing in-plane light intensity of an incident laser light beam arranged on the transmission light path of the attenuator 3b. A substrate 5 to be processed which is to be subjected to a crystallization processing step is positioned and placed in a predetermined position on the substrate stage 6. The crystallization device 1 is configured in such a manner that the substrate 5 to be processed is irradiated with pulsed laser light passing through a path from the light source 3a→the attenuator 3b→the illumination optical system 3c including the homogenizers 33 and 34→the phase shifter 2→the imaging optical system 4. The substrate 5 to be processed is formed in the following manner. That is, an insulating film is formed on an insulating substrate such as a glass substrate, semiconductor substrate, or metallic substrate, then a non-singlecrystalline semiconductor film (for example, an amorphous-silicon film) which is a crystallization object film is formed on the insulating film, and then a cap film (for example, an oxide silicon film and an insulating film having a light absorption property) is formed on the non-singlecrystalline semiconductor film so as to cover the semiconductor film.

The phase shifter 2 is provided between the illumination section 3 and the imaging optical system 4, has predetermined stepped portions, the stepped portions make laser light beams cause Fresnel diffraction thereby to modulate the phase of the incident light flux. The phase shifter 2 forms a desired light intensity profile of strength and weakness for causing the pulsed laser light to melt/crystallize the crystallization object film in an optimum manner by phase-modulating the incident light flux.

The illumination section 3 is provided with a XeCl excimer laser oscillator serving as a light source 3a for outputting energy light for melting the irradiation region of the non-singlecrystalline semiconductor film of the substrate 5 to be processed. The light source 3a is a light source having an inherent property of oscillating pulsed laser light having a wavelength of 308 nm and a pulse width (half-value width) of 30 nsec suited to the absorption wavelength characteristic of the non-singlecrystalline semiconductor film. Incidentally, in this embodiment, a XeCl excimer laser oscillator will be explained as an example of the light source 3a, as a light source other than this, a KrF excimer laser oscillator, ArF excimer laser oscillator, YAG laser oscillator or the like can be used.

The attenuator 3b is used for adjusting an angle of a multilayer film coating filter of a dielectric substance so as to optically modulate light intensity (laser fluence) of laser light, and is provided with a sensor, motor, and control system, operations of which are controlled by a control section 8 to be described later.

Figure 2:
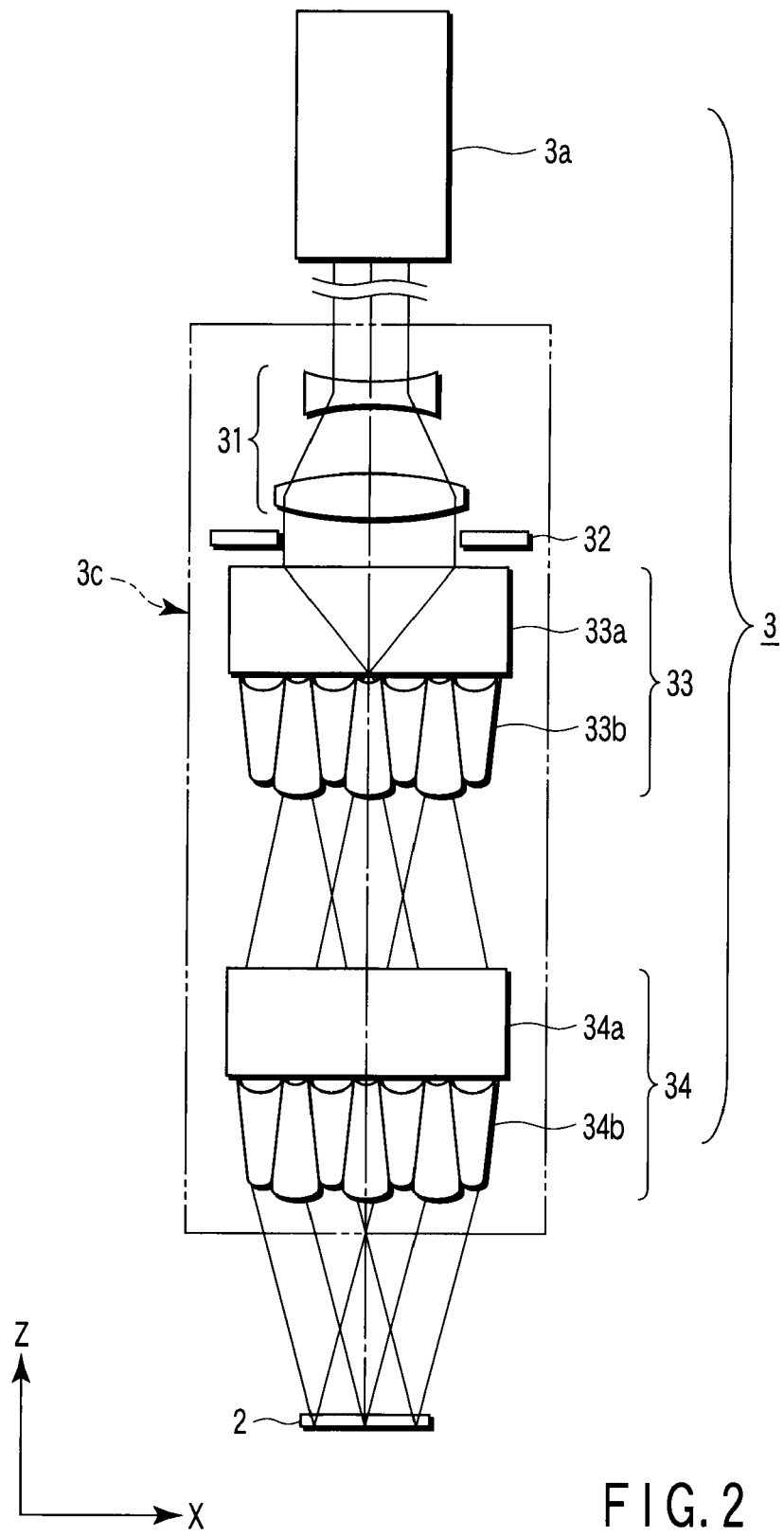
FIG. 2 is a configuration block diagram showing a main part of the laser irradiation device.

Next, the configuration of the illumination section 3 will be concretely described below with reference to FIG. 2. The illumination optical system 3c of the illumination section 3 is arranged so as to allow it to oppose the phase shifter 2. Light intensity of pulsed laser light emitted from the light source 3a is adjusted by the attenuator 3b and, thereafter, the pulsed laser light is made incident on the illumination optical system 3c so as to be subjected to magnification adjustment and light intensity homogenization. A beam diameter of the light beam incident on the illumination optical system 3c is enlarged to a desired size by a beam expander 31, peripheral light of the beam expander 31 is cut by a stop 32, and then the light beam is made incident on the homogenizer.

The homogenizer is an optical device which is constituted of two stages and in which a second homogenizer 34 is subsequently provided on a transmission light path of a first homogenizer 33, thereby homogenizing an in-plane light intensity distribution and incident angle. The homogenized laser light exiting from the illumination optical system 3c irradiates a virtual plane (phase shifter plane) 2a of the phase shifter 2 in a superposing manner, and irradiates an irradiation area surface of the substrate 5 to be processed as laser light having a light intensity distribution of a desired beam profile. The light intensity distribution having a desired beam profile is that in the light in which one or a plurality of, for example, several tens of light intensity distributions having an inverse peak pattern in which light intensity continuously changes, for example, from the minimum light intensity to the maximum light intensity, are arranged two-dimensionally in a plane of laser light.

Subsequently, the laser light phase-modulated by the phase shifter 2 is made incident on the non-singlecrystalline semiconductor film of the substrate 5 to be processed. Here, in the imaging optical system 4, the pattern plane of the phase shifter 2 and the substrate 5 to be processed (to be exact, the top surface of the non-singlecrystalline semiconductor film) are arranged so as to be optically conjugate. In other words, the substrate 5 to be processed is set in a plane (image plane of the imaging optical system 4) optically conjugate with respect to the pattern plane of the phase shifter 2.

The imaging optical system 4 is provided with aperture stops 4c between a front plus lens group 4a and a rear plus lens group 4b. The aperture stops 4c are constituted of a plurality of aperture stops different from each other in, for example, the size of the opening section (light transmission section). These plural aperture stops 4c may be configured so as to be exchangeable with respect to the light path. Alternatively, an iris stop capable of continuously changing the size of the opening section may be used as the aperture stop 4c. In any case, the size (eventually the image side numerical aperture NA) of the opening section of the aperture stop 4c is set, as will be described later, in such a manner that a desired light intensity distribution is generated on the semiconductor layer of the substrate 5 to be processed. This imaging optical system 4 may be a refracting type optical system, a reflecting type optical system or a refracting/reflecting type optical system.

In the crystallization device 1 of this embodiment, the substrate 5 to be processed and a beam profiler 77 (see FIG. 3) (not shown) are arranged in parallel on the substrate stage 6 so as to be replaceable. The beam profiler 77 is positioned in such a manner that an optical axis thereof is parallel with a laser optical axis of the imaging optical system 4. Positioning of the beam profiler 77 and the imaging optical system 4 is performed by using the substrate stage 6 and an alignment mechanism (not shown).

Figure 3:
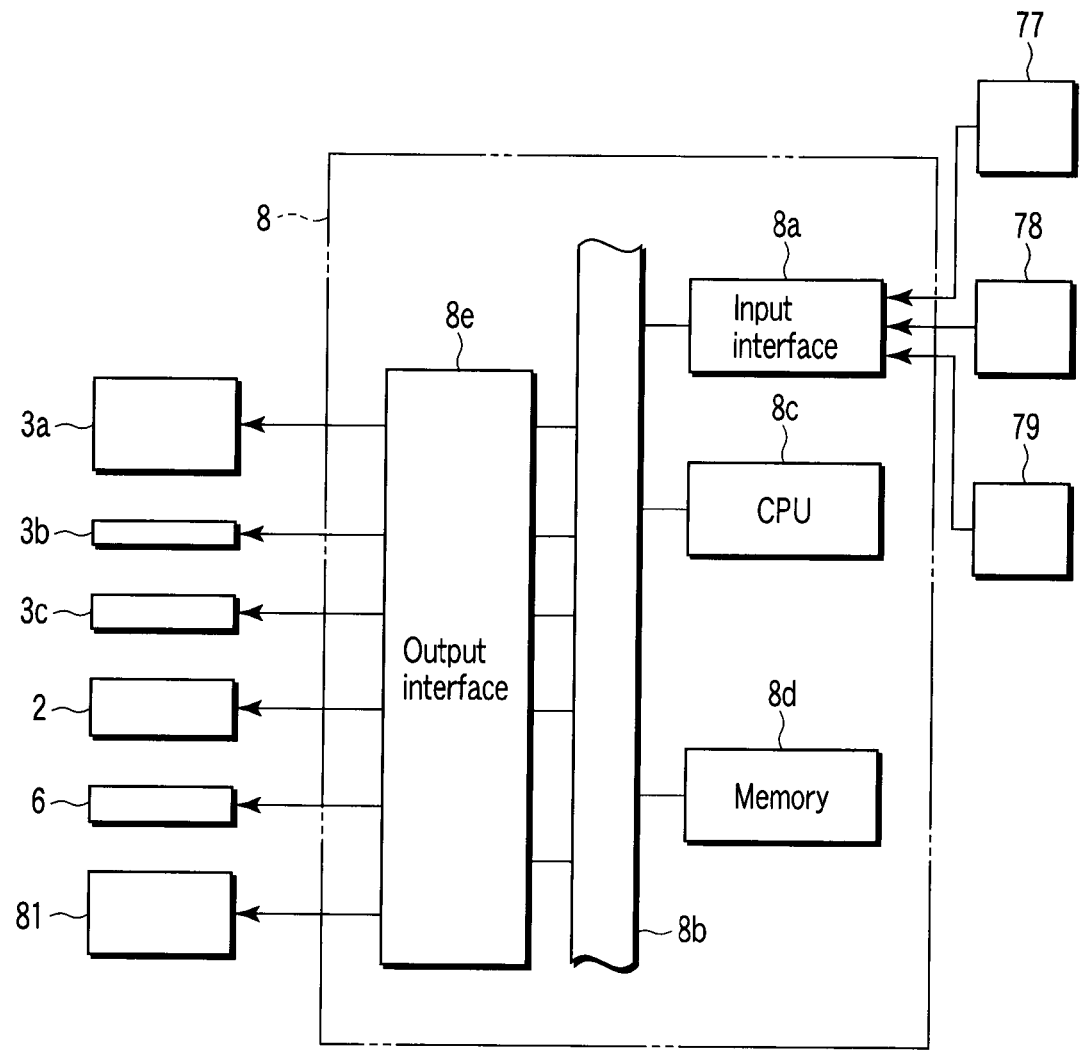
FIG. 3 is a control block diagram of the laser irradiation device.

Next, a control system of this device will be described below with reference to FIG. 3.

The crystallization device 1 is provided with a computer 8 as a control means and recording means. The computer 8 is provided with an input interface 8a, system bus 8b, CPU 8c, memory (recording device) 8d, and output interface 8e.

The beam profiler 77, a height sensor 78, and input device 79 are connected to the input interface 8a, and the laser light source 3a, attenuator 3b, illumination optical system 3c, a positioning mechanism (not shown) of the phase shifter 2, substrate stage 6, a display device 81, and the like are respectively connected to the output interface 8e. The input interface 8a and output interface 8e are respectively connected to the CPU 8c and memory 8d through the system bus 8b.

The beam profiler 77 described above is a mechanism that can display and monitor the beam profile. The height sensor 8 is a height detecting mechanism for measuring a distance from the imaging optical system 4 to the substrate 5 to be processed.

The memory 8d is a recording device for storing and retaining device parameters input from the input device 79 such as a keyboard and the like. The CPU 8c is a control means for reading, as the need arises, a device parameter from the memory 8d in accordance with a recipe input thereto from the input device 79 or in accordance with each detection data item directly input thereto from the beam profiler 77 and height sensor 78, arithmetic-processing the read device parameter, and sending a predetermined command signal to each device section through the output interface 8e.

The display device 81 is a device for displaying various data items output thereto from the computer 8, and is configured in such a manner that device parameters arranged in a table form are displayed on a first display section thereof in an enumerating manner, a substrate map graphic indicating a laser irradiation position on the substrate 5 to be processed is displayed on a second display section, and a beam profile waveform of irradiation laser light is displayed on a third display section. Incidentally, it is desirable that the display device 81 be provided with an alarm mechanism for issuing an alarm when an abnormality occurs in the pulsed laser irradiation device 1. The alarm mechanism may be configured to blink, for example, red light on a screen of the display device 81, or output a warning sound or a speech sound from a loudspeaker.

Next, details of the illumination optical system 3c of a first embodiment of the first homogenizer 33 and the second homogenizer 34 will be described below with reference to FIGS. 2, 4, and 5.

The illumination optical system 3c is provided with the beam expander 31, stop 32, first homogenizer 33, and second homogenizer 34 as described above. The beam expander 31 is a device for enlarging laser light from the light source 3a to a desired size to illuminate the stop 32. The stop 32 is a device having an opening section of a predetermined size for cutting off peripheral light of the beam expander 31, and is used to cut off the peripheral light of the enlarged laser light. The size of the opening section of the stop 32 is, for example, a diameter of 20 mm. The first homogenizer 33 is a device for dividing laser light trimmed by the stop 32 in the X direction and Y direction. The second homogenizer 34 is a device for condensing the divided light in the X direction and Y direction. In this embodiment, the in-plane light intensity distribution and incidence angle distribution of the laser light are homogenized by the first and second homogenizers 33 and 34.

The first homogenizer 33 is formed by combining a first cylindrical lens array 33a and a second cylindrical lens array 33b one above the other with the array 33a being above the array 33b. The expression "one above the other" implies arranging the arrays in the transmission light path, and the second cylindrical lens array 33b may be arranged on the incident light side, and the first cylindrical lens array 33a may be arranged on the outgoing light path of the array 33b.

Figure 4:
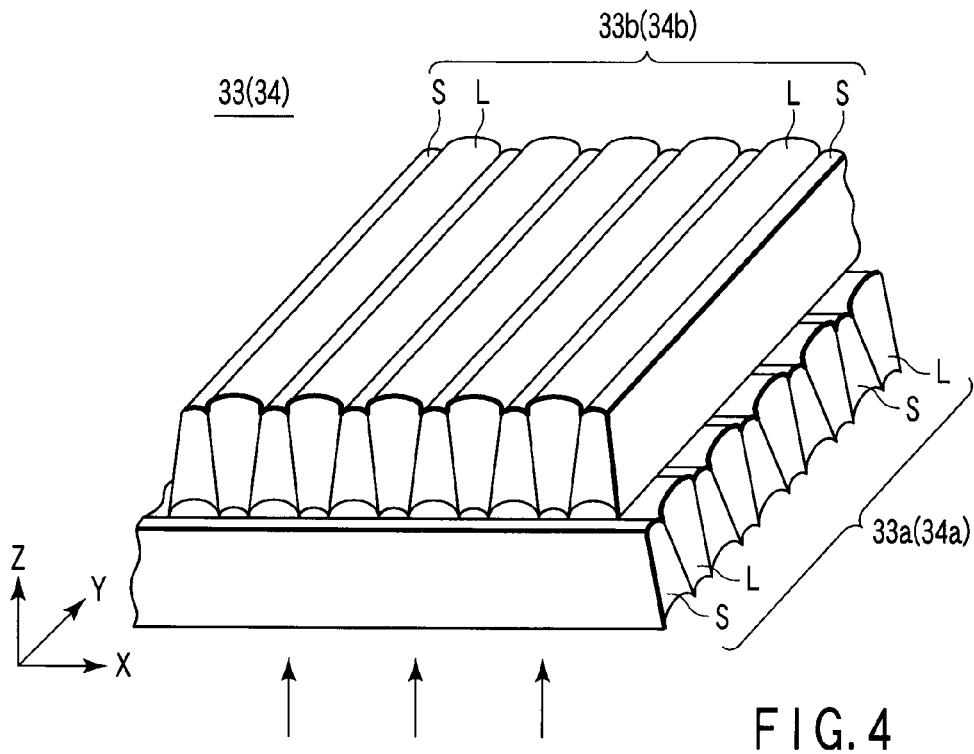
FIG. 4 is a perspective view showing a cylindrical lens array of an optical device according to an embodiment of the present invention.

As shown in FIG. 4, in this combination of the arrays, the longitudinal axis of the first cylindrical lens array 33a extends in the X direction, and the longitudinal axis of the second cylindrical lens array 33b extends in the Y direction. That is, the longitudinal axis of the first cylindrical lens array 33a and the longitudinal axis of the second cylindrical lens array 33b are perpendicular to each other. The first cylindrical lens array 33a is arranged so as to be opposed to the opening section of the stop 32. Further, the second cylindrical lens array 33b is arranged so as to be opposed to a third cylindrical lens array 34a of the second homogenizer 34.

The second homogenizer 34 is formed by combining the third cylindrical lens array 34a and a fourth cylindrical lens array 34b one above the other with the array 34a being above the array 34b. In this combination of the arrays, as in the above combination, as shown in FIG. 4, the longitudinal axis of the third cylindrical lens array 34a extends in the X direction, and the longitudinal axis of the fourth cylindrical lens array 34b extends in the Y direction. That is, the longitudinal axis of the third cylindrical lens array 34a and the longitudinal axis of the fourth cylindrical lens array 34b are perpendicular to each other. Incidentally, the third cylindrical lens array 34a has a configuration and a function which are optically equivalent to those of the first cylindrical lens array 33a, and the fourth cylindrical lens array 34b has a configuration and a function which are optically equivalent to those of the second cylindrical lens array 33b.

In the first homogenizer 33, the first cylindrical lens array 33a divides the laser light in the Y direction, and the second cylindrical lens array 33b divides the laser light passing through the first cylindrical lens array 33a in the X direction. Further, in the second homogenizer 34, the third cylindrical lens array 34a condenses the laser light passing through the second cylindrical lens array 33b in the Y direction, and the fourth cylindrical lens array 34b condenses the laser light passing through the third cylindrical lens array 34a in the X direction. Further, the phase shifter plane 2a which is optically conjugate with respect to the irradiation area surface of the substrate 5 to be processed is irradiated with the laser light in a superposing manner. Incidentally, the phase shifter plane 2a is not a plane physically exist, but is a virtual plane in the optical theory.

Figure 5:
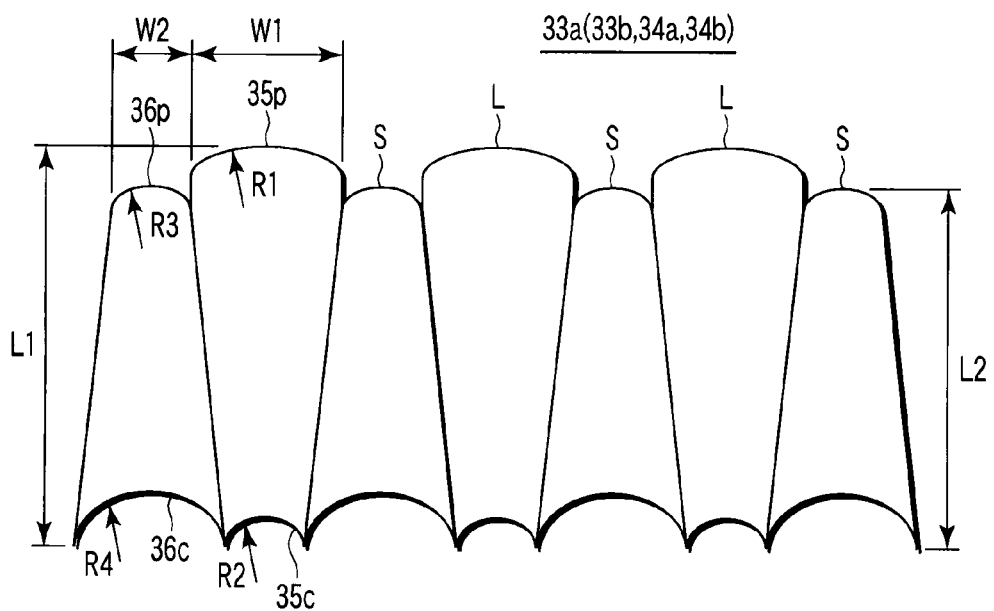
FIG. 5 is a partial enlarged schematic cross-sectional view of the cylindrical lens array shown in FIG. 4.

As shown in the enlarged view of FIG. 4 in FIG. 5, each of the first, second, third, and fourth cylindrical lens arrays 33a, 33b, 34a, and 34b has a plurality of first lens segments L each having a predetermined cross-sectional shape perpendicular to the longitudinal axis, and a plurality of second lens segments S each having a cross-sectional shape perpendicular to the longitudinal axis different from the cross-sectional shape perpendicular to the longitudinal axis of the first lens segment L. The first lens segments L and the second lens segments S are alternately arranged. As a result, a first lens segment L is interposed between a pair of second lens segments S and, conversely, a second lens segment S is interposed between a pair of first lens segments.

In the first lens segment L, a cross-sectional shape perpendicular to the longitudinal axis is a wedge-like shape, and the width of the exit section 35p from which the transmission light exits is larger than that of the incidence section 35c on which the light is incident. Further, in the second lens segment S, a cross-sectional shape perpendicular to the longitudinal axis is a wedge-like shape arranged in the direction reverse to that of the first lens segment L, and the width of the exit section 36p from which the transmission light exits is smaller than that of the incidence section 36c on which the light is incident.

In this embodiment, the ratio of the width of the exit section 35p of the first lens segment L to that of the exit section 36p of the second lens segment S is made to be 9:1. It is desirable that this ratio be within the range of 1:1 to 50:1. This is because if the ratio exceeds 50:1, the problem is caused that light condensing or the like occurs to disturb uniformity.

In the first lens segment L, the radius of curvature R1 of the convex exit section 35p is larger than the radius of curvature R2 of the concave incident section 35c (R1>R2). On the other hand, in the second lens segment S, the radius of curvature R3 of the convex exit section 36p is smaller than the radius of curvature R4 of the concave incident section 36c (R3<R4).

In this embodiment, for example, the radius of curvature R1 is 2 mm, radius of curvature R2 is 1 mm, radius of curvature R3 is 1 mm, and radius of curvature R4 is 2 mm. Further, the height (length in the Z direction) L1 of the first lens segment L is 30 mm, and the height (length in the Z direction) L2 of the second lens segment S is 30 mm. It is desirable that the radius of curvature R1 be within the range of 0.2 to 10 mm. It is desirable that the radius of curvature R2 be within the range of 0.2 to 10 mm. It is desirable that the radius of curvature R3 be within the range of 0.2 to 10 mm. It is desirable that the radius of curvature R4 be within the range of 0.2 to 10 mm. It is desirable that the ratio R1/R3 of the radius of curvature R1 to the radius of curvature R3 be within the range of 1:1 to 50:1. This is because if the ratio R1/R3 exceeds 50:1, the problem is caused that light condensing or the like occurs to disturb uniformity.

The cylindrical lens arrays 33a, 33b, 34a, and 34b described above are manufactured in, for example, the following manner.

Industrially pure quartz ($SiO_2$ having purity of 99.999%) is heated/melted in a vacuum furnace, the molten quartz is put into a casting mold having a predetermined shape, and then the molten quartz is slowly cooled by taking enough time. After the quartz is completely solidified, the primary product of the quartz cylindrical lens array is taken out of the casting mold, the primary product is polished so as to allow it to have a mirror surface having surface roughness of $\lambda/5$ ($\lambda$=632.8 nm) or more. The error tolerance of the final finished dimension is made to be ±5 μm or less.

Figure 6:
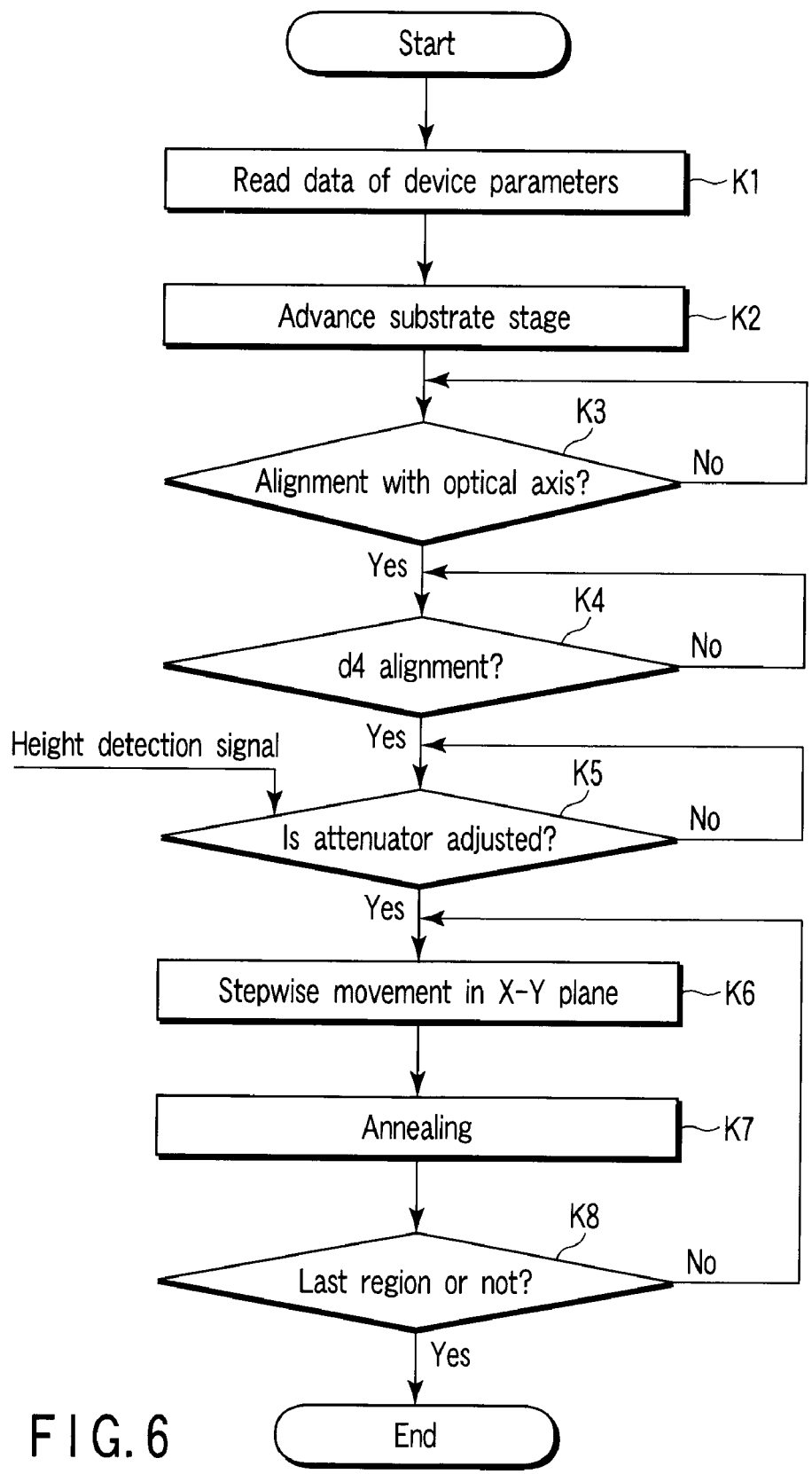
FIG. 6 is a flowchart of the ELA crystallization method in which the optical device of the present invention is used.

Next, the case where an amorphgous silicon film is actually crystallized by using the above-mentioned crystallization apparatus 1, i.e., the projection type excimer laser irradiation device (PJELA) will be described below with reference to FIG. 6.

When the main switch of the PJELA 1 is turned on, the control section 8 automatically reads data of the device parameters, and various device parameters are displayed on the screen of the display device 81 as a tabulated list (step K1). The substrate stage 6 automatically advances into the irradiation posion (aligned with the laser optical axis) in the state where the substrate 5 to be processed is retained thereon (step K2). At this time, the incidence plane of the substrate 5 to be processed is moved to a position for crystallization so as to be aligned with the laser optical axis of the light source side (step K3). On the basis of a target deviation amount value included in the read device parameters, the computer 8 controls the Z direction operation of the substrate stage 6 by using a detection signal from the height sensor 78 to cause the deviation amount of the substrate stage 6 and the substrate 5 to be processed coincide with the target deviation amount value (step K4). The device parameter used at this time may be the optimum device parameter which was used last time, or a value assumed to be ideal by simulation.

Next, on the basis of the read device parameter, the attenuator 3b is automatically adjusted (step K5). Specifically, the light intensity measured by using the beam profiler 77 and the target light intensity set in advance are compared with each other, thereby calculating an attenuator operation amount, and the angle of the attenuator 3b is adjusted with high accuracy while feedback is performed in such a manner that the intensity measured by outputting an actuating signal to the attenuator 3b becomes the target intensity.

The substrate stage 6 is configured such that it can change its position by stepwise movement of a predetermined interval in the X-Y plane, and hence it is possible to position a desired part of the substrate 5 to be processed in the irradiation position, and crystallize an amorphous silicon film having a large area by repeating the X-Y step movement step K6 and the crystallization (annealing) step K7 (steps K6 and K7). This state is displayed on the screen of the display device 81, and the operator can therefore know which part on the substrate 5 to be processed is now irradiated with the laser light in real time.

In the crystallization step K7, laser light having a wavelength of 308 nm, and a pulse width of 30 nsec is emitted from the XeCl excimer laser device serving as the light source. The pulsed laser light is optically adjusted through the attenuator 3b, illumination optical system 3c, phase shifter 2, and imaging optical system 4 so as to have a beam profile waveform of a desired inverse peak pattern. Finally, the amorphous thin film on the substrate 5 to be processed is irradiated with the above-mentioned adjusted pulsed laser light. As a result, the amorphous thin film is melted, and is crystallized in the process of coagulation. In the substrate 5 to be processed, a foundation film, amorphous silicon film (semiconductor layer), and cap film are formed in sequence on, for example, a glass substrate for liquid crystal display by the chemical vapor deposition (CVD). The foundation insulating film is formed of an insulating material such as $SiO_2$, prevents a foreign substance such as Na in the glass substrate from being mixed into the amorphous silicon film by the direct contact of the amorphous silicon film and the glass substrate, and prevents the melting temperature of the amorphous silicon film from being directly transmitted to the glass substrate. The amorphous silicon film is a semiconductor film to be crystallized, and is a non-singlecrystalline film such as an amorphous semiconductor film and polycrystalline semiconductor.

The non-singlecrystalline film is not limited to the above-mentioned semiconductor film, and may be a film constituted of a non-singlecrystalline material such as a non-singlecrystalline metal. An insulating film such as an $SiO_2$ film is preferably formed on the amorphous silicon film as a cap film. The cap film is heated by a part of a laser beam incident on the amorphous silicon film, and stores the heating temperature. This thermal storage effect relieves a temperature fall gradient and promotes crystal growth of a large grain size in the lateral direction when the incident light beam is cut off, although if the cap film is not provided, and when the incident light beam is cut off, the temperature of a high-temperature part on the irradiation surface of the amorphous silicon film relatively and quickly lowers. Incidentally, the substrate 5 to be processed is positioned and held in a predetermined position set in advance on the substrate stage 6 by a vacuum chuck or an electrostatic chuck.

It is determined whether or not the preceding irradiation region is the last region (step K8), and when the determination result of step K8 is NO, the operations of steps K6 to K7 are repeatedly performed, and the other regions of the substrate 5 to be processed are successively crystallized. By repeating crystallization by shifting the irradiation region as described above, a large area can be crystallized. When the determination result of step K8 is YES, it is assumed that an end point is detected, the substrate stage 6 is returned to the home position, and the crystallization process is terminated.

A thin film transistor can be formed by positioning of the crystallized crystallization region in the manner described above. That is, a gate oxide film is formed on the crystallization region, and a gate electrode is formed on the gate oxide film. A contact hole for forming source/drain electrodes is formed by using the gate electrode as a mask. Then, impurities for forming source/drain regions are ion-implanted by using the gate electrode as a mask, and an activation process is performed. Then, source/drain electrodes are formed in the contact hole, whereby a thin film transistor can be formed.

In the above embodiment, the case where the step of detecting and confirming the light intensity distribution is executed once before the crystallization step has been described. However, detection and confirmation of the light intensity distribution may be performed at the beginning of the series of processes, and thereafter the entire surface of one substrate 5 to be processed may be crystallized. Alternatively, detection and confirmation of the light intensity distribution may be performed once every several, every several tens, every several hundreds, and every several thousands of crystallization regions. Incidentally, the more the number of detection and confirmation steps of the light intensity distribution is, the more homogeneous the crystallization becomes that can be executed. As a result, laser irradiation excellent in reproducibility can be realized, and crystallization of an amorphous silicon film can be executed stably.

Furthermore, in the embodiment described above, as for the homogenizer, the first homogenizer 33 and the second homogenizer 34 are provided on the transmission light path, thereby forming a homogenizer having a two-stage configuration, and cylindrical lens arrays 33a and 33b, and cylindrical lens arrays 34a and 34b, in which the longitudinal axes are perpendicular to each other are provided to the homogenizers 33 and 34, respectively. However, the present invention is not limited to the above embodiment. The ringing phenomenon occurs in only one of the cylindrical lens arrays 33a and 34a, or in only one of the cylindrical lens arrays 33b and 34b, and hence a homogenizer having only a one-stage configuration provides the same effect.

SECOND EMBODIMENT

Next, a cylindrical lens array of a homogenizer used in an illumination optical system of a second embodiment will be described below with reference to FIGS. 7A, 7B, 8A, and 8B. Here, the cylindrical lens array of the homogenizer of the second embodiment will be described by comparing it with a cylindrical lens array of a conventional homogenizer. Incidentally, description of the part of this embodiment that overlaps with the above-mentioned embodiment will be omitted.

In the cylindrical lens array 300 of the conventional homogenizer, lens segments M having the same shape and size are arranged adjacent to each other. That is, the lens segments M each have a cross section of a semicylindrical shape (a shape of a combination of a semicircle or semiellipse and a rectangle or a semicylindrical or pseudo-semicylindrical shape) perpendicular to the longitudinal axis, and are formed so as to have the same width $W_0$ and the same radius of curvature $R_0$ of the exit section.

On the other hand, in the cylindrical lens array 30 of this embodiment, lens segments L, S1, L, S2, and L having shapes and sizes different from each other are arranged adjacent to each other. That is, the large lens segment L and the small lens segments S1 and S2 are different from each other in the shape and size. The width W1 and the radius of curvature R1 of the exit section of the large lens segment L is larger than the widths W2 and W3 and the radii of curvature R2 and R3 of the exit sections.

In this embodiment, for example, the radius of curvature R1 is 2 mm, and radius of curvature R2 is 0.5 mm. It is desirable that the radius of curvature R1 be within a range of 0.2 to 20 mm. It is desirable that the radius of curvature R2 be within a range of 0.2 to 20 mm. It is desirable that the radius of curvature R3 be within a range of 0.2 to 20 mm.

Further, in the embodiment, the width W1 is 1.5 mm, width W2 is 0.6 mm, and width W3 is 0.5 mm. It is desirable that the width W4 be within a range of 0.2 to 10 mm. It is desirable that the width W5 be within a range of 0.2 to 10 mm. It is desirable that the width W6 be within a range of 0.2 to 10 mm.

Figure 7A:
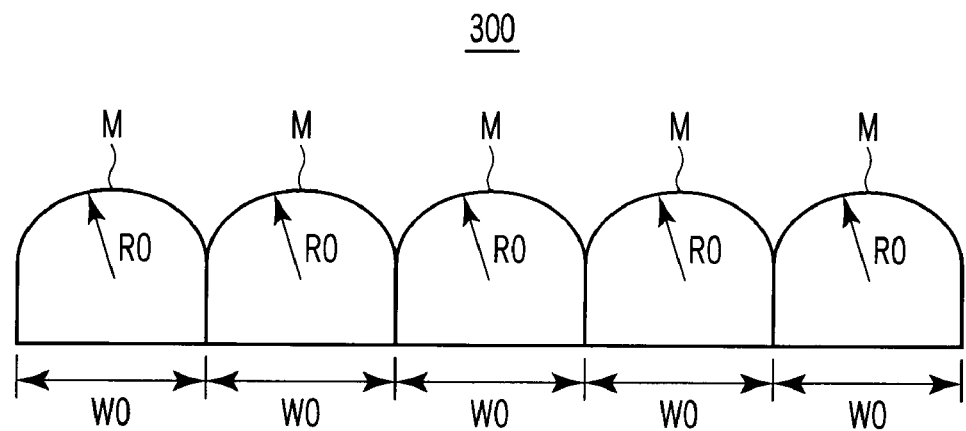
FIG. 7A is a schematic cross-sectional view showing a cylindrical lens array of a conventional optical device.
Figure 7B:
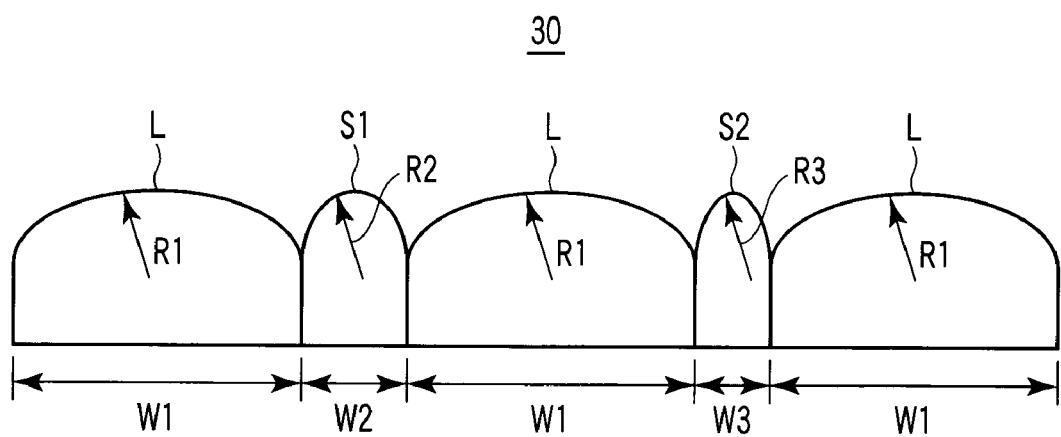
FIG. 7B is a schematic cross-sectional view showing a cylindrical lens array of the optical device of the present invention.

Next, that the cylindrical lens array 30 of FIGS. 7A and 7B has a ringing suppression effect will be described below with reference to FIGS. 8A and 8B.

Figure 8A:
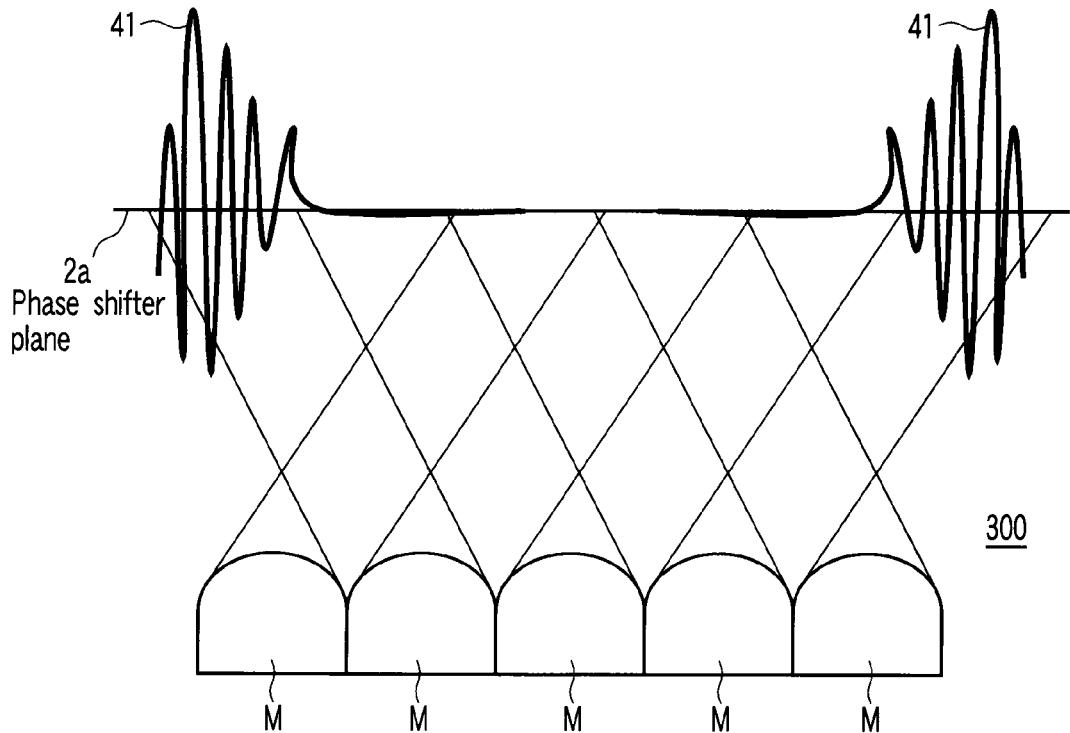
FIG. 8A is a schematic view showing the light intensity distribution of laser light passed through the conventional optical device on a plane of a phase shifter.

In the laser light transmitted through the conventional cylindrical lens array 300, large ringing 41 occurs conspicuously in both end regions of the phase shifter plane 2a as shown in FIG. 8A. Such conspicuously large ringing 41 occurs due to a light shape of the light source side and interference or the like caused by the lens segments.

Figure 8B:
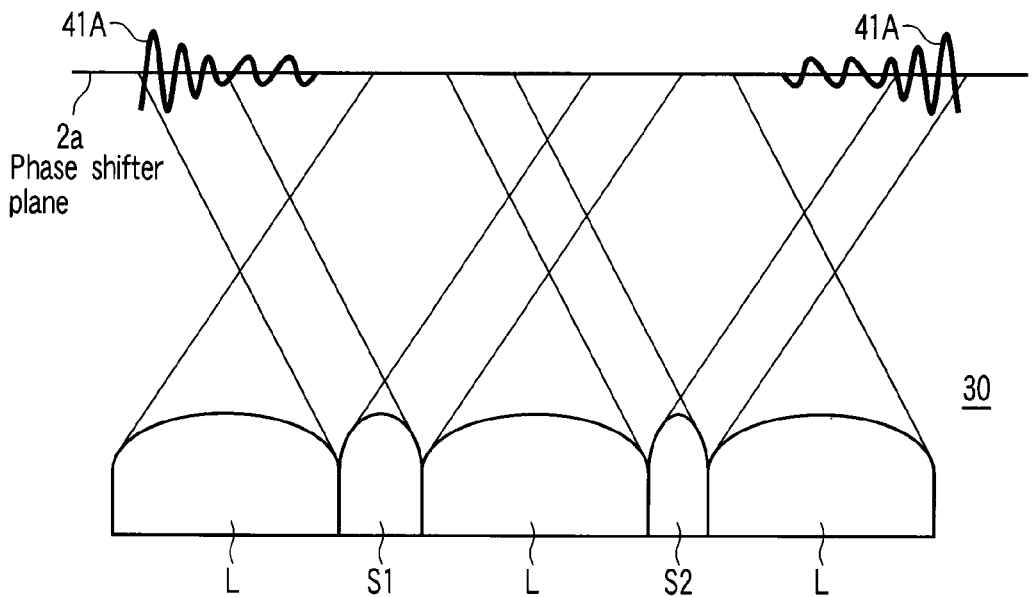
FIG. 8B is a schematic view showing the light intensity distribution of laser light passed through the optical device of the present invention on a plane of a phase shifter.

On the other hand, in the laser light which has passed through the cylindrical lens array 30 of this embodiment, ringing 41A occurring on the phase shifter plane 2a is kept small by the function of the lens segment S1 as shown in FIG. 8B. This is because adjacent lens segments L, S1, and S2 are made different from each other in the cross-sectional shape (the width and radius of curvature) perpendicular to the longitudinal axis, and thus the laser light passing through the large lens segments L and the laser light passing through the small lens segments S1 and S2 interfere with each other on the phase shifter plane 2a on which these light components are superposed upon each other in the same region. Further, the ringing components occurring on both ends of the phase shifter plane are dispersed by the interferential action of the light. As a result of this, uniformity of the laser light on the phase shifter plane 2a is enhanced.

In the embodiment described above, an example of an optical device in which adjacent lens segments L, S1, and S2 are made different from each other in the cross-sectional shape (the width and radius of curvature) perpendicular to the longitudinal axis has been explained. However, the present invention is not limited only to the embodiment described above.

Figure 9A:
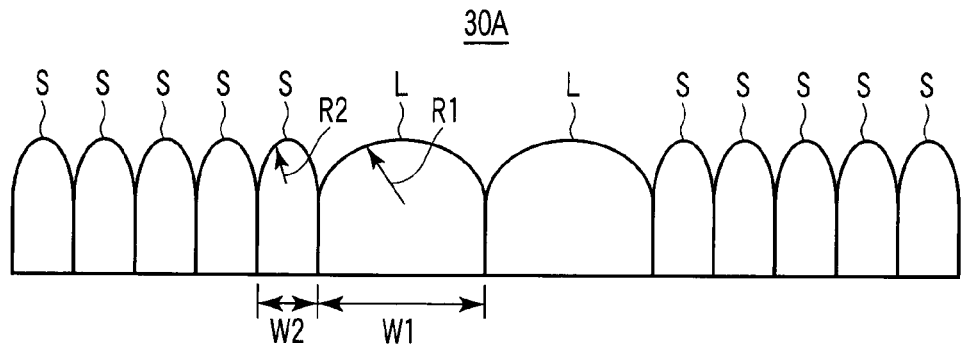
FIGS. 9A, 9B, and 9C are schematic cross-sectional views showing cylindrical lens arrays of optical devices according to another embodiment of the present invention.

For example, one or a plurality of lens segments S3 may be interposed between lens segments M of FIG. 8A in appropriate positions. Further, the optical device 30A shown in FIG. 9A is an example in which two large lens segments L are arranged at the center of the cylindrical lens array, and five small lens segments S are arranged on both sides of the lens segments L. The radius of curvature and the width of the large lens segment L are larger than those of the small lens segment S.

In this embodiment, for example, the radius of curvature R1 of the large lens segment L is 2 mm, the radius of curvature R2 of the small lens segment S is 0.5 mm. It is desirable that the radius of curvature R1 be within a range of 0.2 to 20 mm. It is desirable that the radius of curvature R2 be within a range of 0.2 to 20 mm.

Further, in this embodiment, the width W1 of the large lens segment L is 1.5 mm, and the width W2 of the small lens segment S is 0.4 mm. It is desirable that the width W1 be within a range of 0.1 to 2 mm. It is desirable that the width W2 be within a range of 0.1 to 2 mm.

According to the optical device 30A of this embodiment, lens segments each having a large radius of curvature are arranged at the center, and lens segments each having a small radius of curvature are arranged in the end positions. Therefore, an effect of canceling unevenness in light intensity such as ringing occurring at both ends can be obtained by finely converging the light at both ends, depending on the shape of the light source.

Figure 9B:
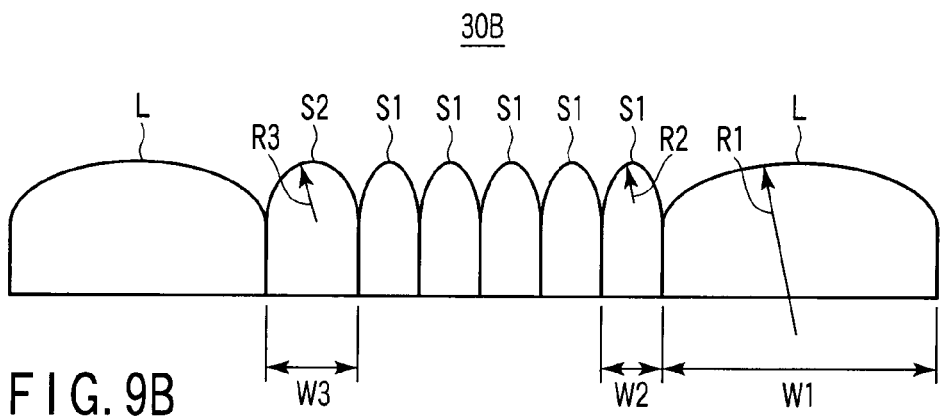

Further, in the homogenizer 30B shown in FIG. 9B, six small lens segments S1 and S2 are arranged at the center of the cylindrical lens array, and one large lens segment is arranged on either side of the cylindrical lens array. In the arrangement of small lens segments in the center, the second small lens segment S2 is arranged so as to be drawn to one side. This second small lens segment has a radius of curvature and width both of which are larger than those of any one of the other five first small lens segments S1.

In this embodiment, for example, the radius of curvature R1 of the large lens segment L is 2 mm, the radius of curvature R2 of the first small lens segment S1 is 0.5 mm, and the radius of curvature R3 of the second small lens segment S2 is 0.3 mm. Incidentally, it is desirable that the radius of curvature R1 be within a range of 0.2 to 2 mm. It is desirable that the radius of curvature R2 be within a range of 0.2 to 2 mm. It is desirable that the radius of curvature R3 be within a range of 0.2 to 2 mm.

Further, in this embodiment, the width W1 of the large lens segment L is 1.5 mm, the width W2 of the first small lens segment S1 is 0.4 mm, and the width W3 of the second small lens segment S2 is 0.2 mm. It is desirable that the width W1 be within a range of 0.1 to 2 mm. It is desirable that the width W2 be within a range of 0.1 to 2 mm. It is desirable that the width W3 be within a range of 0.1 to 2 mm.

According to the optical device 30B of this embodiment, lens segments each having a small radius of curvature are arranged at the center, and lens segments each having a large radius of curvature are arranged at both ends. Therefore, an effect of suppressing unevenness in light intensity resulting from ringing or interference can be obtained by finely converging the light at the center, depending on the shape of the light source.

Figure 9C:
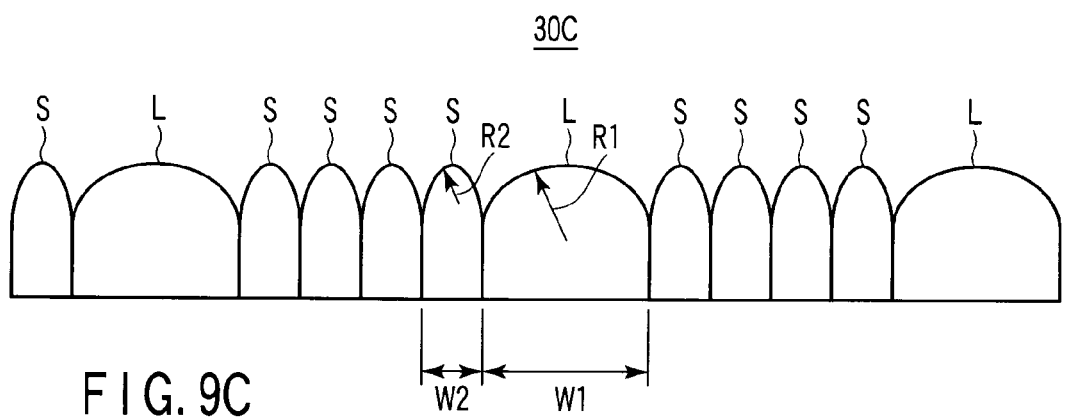

Furthermore, in the optical device 30C shown in FIG. 9C, a cylindrical lens array is formed by alternately arranging a large lens segment L and a group of small lens segments S (in this embodiment, four lens segments S are made into a group). That is, in the cylindrical lens array of the optical device 30C of this embodiment, large and small lens segments L and S are arranged so as to be dispersed.

In this embodiment, for example, the radius of curvature R1 of the large lens segment L is 2 mm, the radius of curvature R2 of the small lens segment S is 0.5 mm. It is desirable that the radius of curvature R1 be within a range of 0.2 to 2 mm. It is desirable that the radius of curvature R2 be within a range of 0.2 to 2 mm.

Further, in this embodiment, the width W1 of the large lens segment L is 1.5 mm, and the width W2 of the small lens segment S is 0.4 mm. It is desirable that the width W1 be within a range of 0.1 to 20 mm. It is desirable that the width W2 be within a range of 0.1 to 20 mm.

According to the optical device 30C of this embodiment, lens segments having a large radius of curvature and those having a small radius of curvature are arranged at random. Therefore, an effect of wholly suppressing unevenness in light intensity such as ringing can be obtained by randomly converging the light, depending on the shape of the light source.

Although various embodiments have been described above, the present invention is not limited only to the embodiments described above, and can be variously modified or combined.

The present invention can be utilized for crystallization of a thin film transistor (TFT) used as a switching element for selecting display pixels of a liquid crystal display (LCD).

According to the present invention, it is possible to obtain an optical device and a crystallization device capable of suppressing ringing and radiating homogeneous laser light. In each cylindrical lens array, the cross-sectional shapes (widths and radii of curvature) perpendicular to the longitudinal axes of the adjacent first and second lens segments are provided so as to be made different from each other, whereby the laser light transmitted through the first lens segments and the laser light transmitted through the second lens segments interfere with each other on the virtual plane (phase shifter plane) on which both the light components are superposed upon each other in the same region, and thus the ringing components are dispersed by the interferential action of the light. As a result of this, an optical device in which uniformity of the in-plane light intensity distribution of the incident light is high in the phase shifter plane can be obtained. Furthermore, in the crystallization device, desired meltage and crystallization are promoted throughout the entire region of the irradiation area, a crystallization region of a large grain size can be formed, and a singlecrystalline region that can be obtained at a high yield rate and with little loss, for example, a singlecrystalline silicon film can be obtained.

What is claimed is:

1. An optical device comprising:
a first cylindrical lens array in which a plurality of first lens segments each having a semicylindrical or pseudo-semicylindrical shape and having a first radius of curvature and a first width so as to divide laser light into a plurality of light components are arranged; and
second lens segments each having a semicylindrical shape or a pseudo-semicylindrical shape and having a second radius of curvature and a second width which are respectively different from the first radius of curvature and the first width, and provided in at least one position of the first cylindrical lens array so as to be interposed between adjacent first lens segments,
wherein
in the first lens segment, a cross-section shape perpendicular to a longitudinal axis thereof is a wedge-like shape, and a width of an exit section from which transmission light exits is larger than that of an incidence section on which light is incident, and
in the second lens segment, a cross-sectional shape perpendicular to a longitudinal axis thereof is a wedge-like shape arranged in the direction reverse to that of the first lens segment, and a width of an exit section from which transmission light exists is smaller than that of an incidence section on which light is incident.

2. An optical device comprising:
a plurality of first cylindrical lens arrays in which first lens segments each having a semicylindrical or a pseudo-semicylindrical shape and having a first radius of curvature and a first width so as to divide laser light into a plurality of light components are arranged;
second cylindrical lens arrays provided between first lens segments of each of the first cylindrical lens arrays, in each of which a plurality of second lens segments each having a semicylindrical or a pseudo-semicylindrical shape and having a second radius of curvature different from the first radius of curvature and a second width different from the first width are arranged,
wherein
in the first lens segment, a cross-sectional shape perpendicular to a longitudinal axis thereof is a wedge-like shape, and a width of an exit section from which transmission light exits is larger than that of an incidence section on which light is incident, and
in the second lens segment, a cross-sectional shape perpendicular to a longitudinal axis thereof is a wedge-like shape arranged in the direction reverse to that of the first lens segment, and a width of an exit section from which transmission light exits is smaller than that of an incidence section on which light is incident.

3. An optical device comprising:
a first cylindrical lens array in which a plurality of first lens segments each having a first radius of curvature and a first width so as to divide incident laser light into a plurality of light components in one direction are arranged;
a second cylindrical lens array in which a plurality of second lens segments each having a second radius of curvature and a second width which are respectively different from the first radius of curvature and the first width so as to divide the laser light transmitted through the first cylindrical lens array in a direction perpendicular to the one direction are arranged;
a third cylindrical lens array in which a plurality of first lens segments each having the first radius of curvature and the first width so as to converge the laser light transmitted through the second cylindrical lens array in the one direction are arranged; and
a fourth cylindrical lens array in which a plurality of second lens segments each having the second radius of curvature and the second width so as to converge the laser light transmitted through the third cylindrical lens array in the direction perpendicular to the one direction are arranged, wherein
each of the first, second, third, and fourth cylindrical lens array has second lens segments provided in at least one position of the cylindrical lens array so as to be interposed between adjacent first lens segments.

4. The optical device according to claim 3, wherein the first and second lens segments are a lens having a semicylindrical or a pseudo-semicylindrical shape.

5. The optical device according to claim 3, wherein in the first lens segment, a cross-sectional shape perpendicular to a longitudinal axis thereof is a wedge-like shape, and a width of an exit section from which transmission light exits is larger than that of an incidence section on which light is incident, and in the second lens segment, a cross-sectional shape perpendicular to a longitudinal axis thereof is a wedge-like shape arranged in the direction reverse to that of the first lens segment, and a width of an exit section from which transmission light exits is smaller than that of an incidence section on which light is incident.

* * * * *